United States Patent [19]

Smith

[11] 3,740,794
[45] June 26, 1973

[54] FISH FILLET AID

[76] Inventor: George R. Smith, 54½ E. Market Street, Jamestown, Ohio 45385

[22] Filed: Dec. 15, 1971

[21] Appl. No.: 208,213

[52] U.S. Cl. .................................................. 17/70
[51] Int. Cl. ............................................. A22c 25/00
[58] Field of Search ............................... 17/70, 44.3

[56] References Cited
UNITED STATES PATENTS
2,945,256   7/1960   Harper ..................................... 17/70

Primary Examiner—Louis G. Mancene
Assistant Examiner—D. L. Weinhold
Attorney—Harvey B. Jacobson

[57] ABSTRACT

A device for securely holding a fish during the filleting thereof includes an L-shaped base member for supporting the fish in a vertical position and clamps to rigidly hold the fish at its head, body and tail portions to the member. The head clamp comprises depending spring-loaded fingers which cooperate with a plurality of upwardly projecting pins to rigidly hold the lower jaw of the fish. The body clamp includes arcuate arm portions to grasp the backbone or flesh of the fish and hold it securely against the base member. The tail clamp includes a spiked member movable laterally relative to the base member to securely engage the tail of the fish.

12 Claims, 6 Drawing Figures

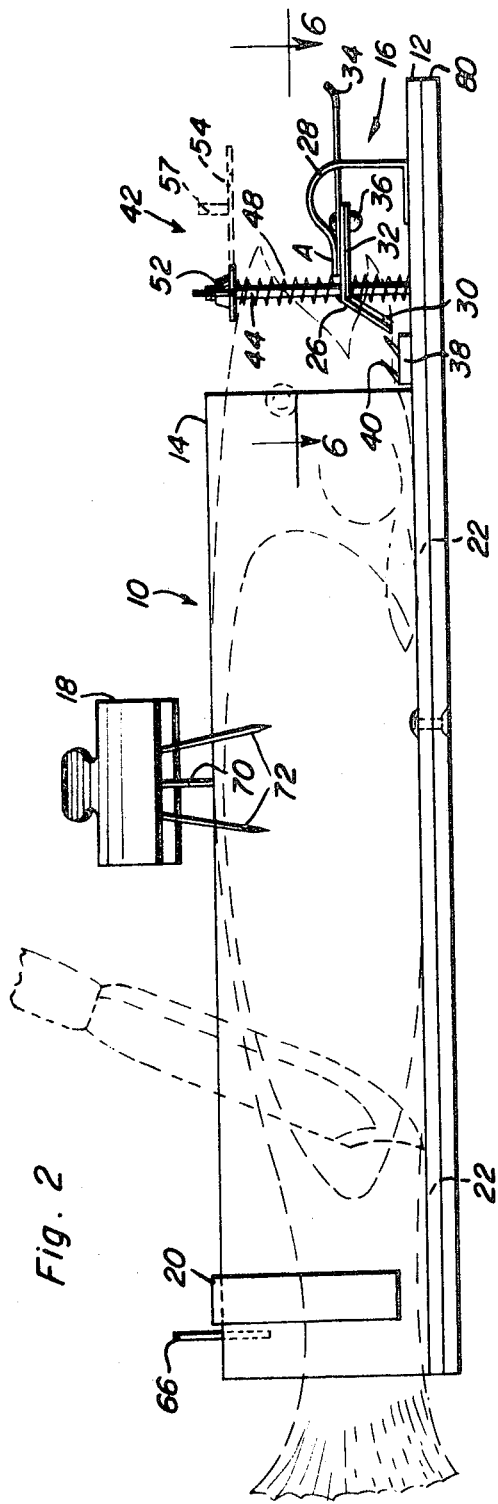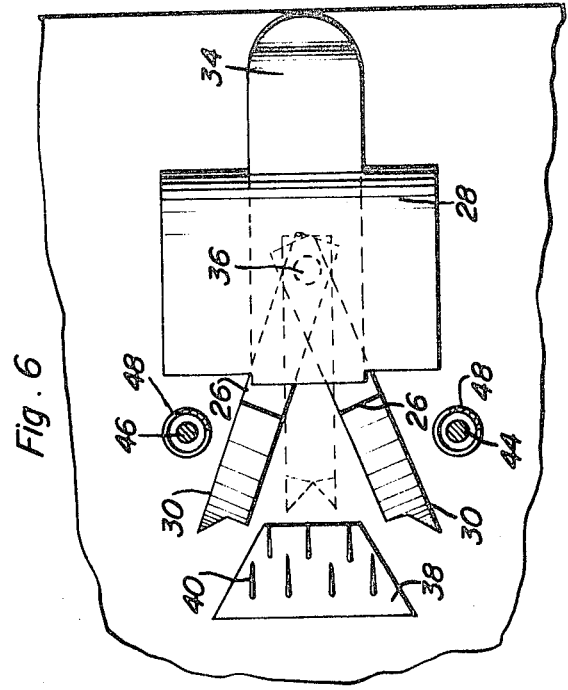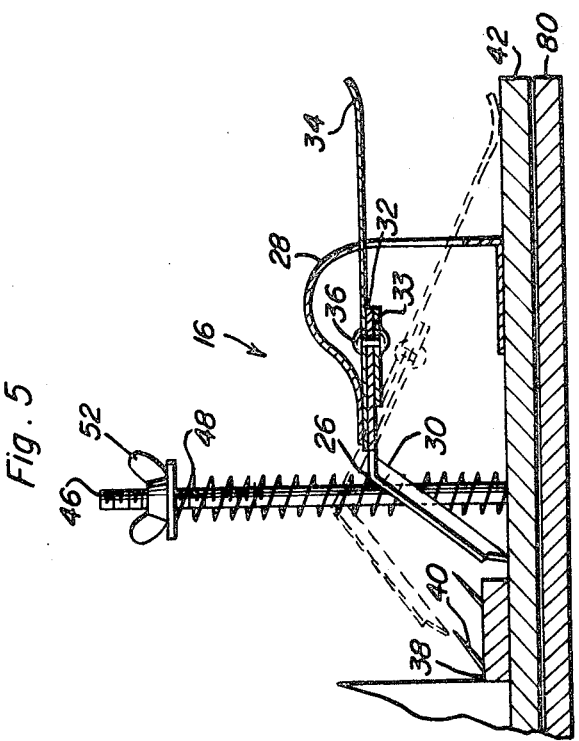

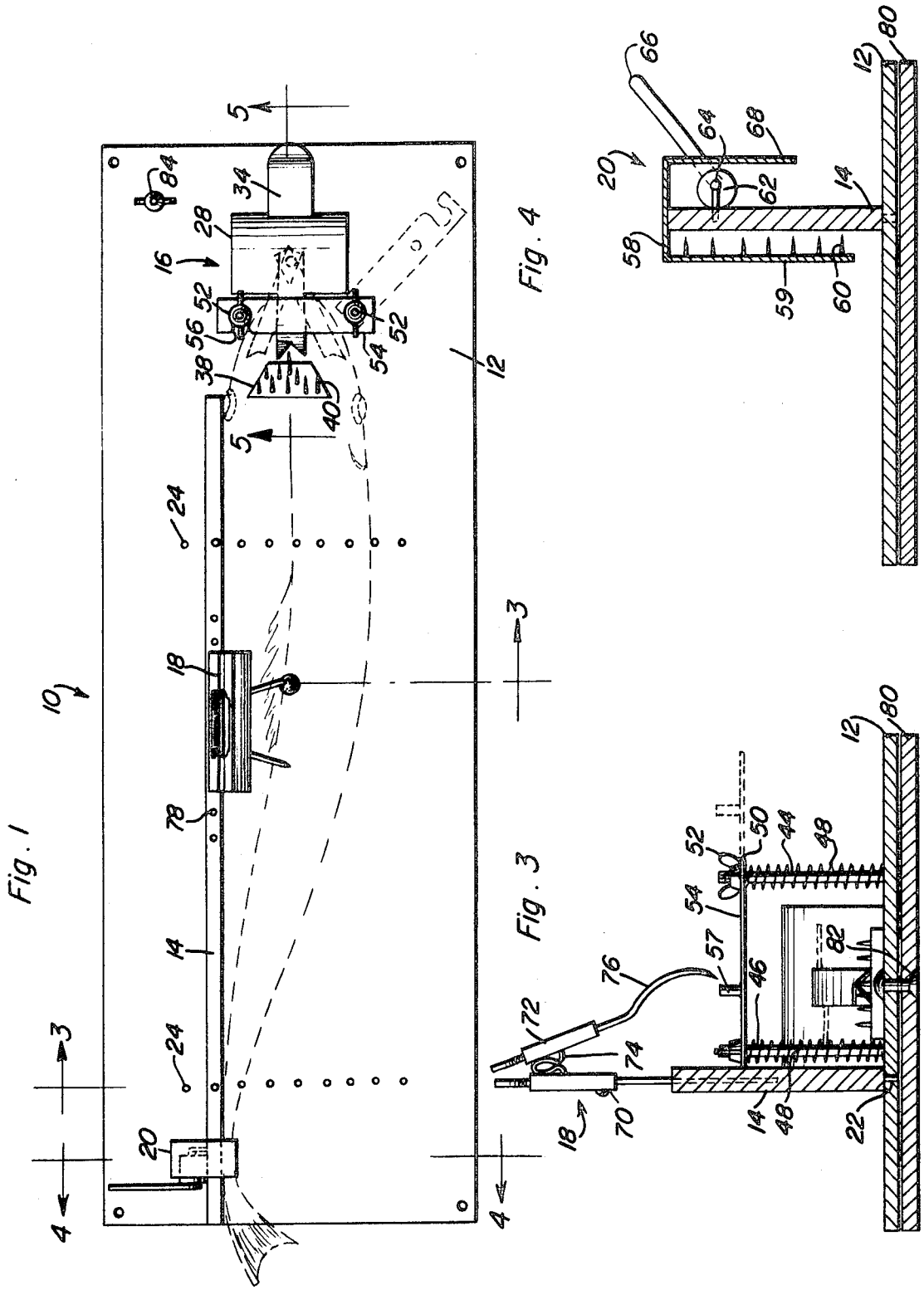

3,740,794

FISH FILLET AID

The present invention relates to a device for securely holding a fish during the filleting thereof, and more particularly to a device which clamps the fish to a base member at three separate locations along the body thereof.

Proper and careful filleting of fish requires that both hands be free to cut and simultaneously pull the fillet from the fish. It is therefore desirable to utilize a device which holds the fish securely in place during the filleting. It is also desirable that the fish be held in such a position that the filleting may be accomplished without either removing the rib bones or including them in the filleted piece. Presently available devices usually support a fish on its side, i.e. horizontally, by clamping its head to a filleting board or base member. It has been found, however, that when a fish is filleted in the horizontal position it is almost impossible to obtain a fillet free of rib bones unless the bones are removed subsequent to the filleting. In addition, clamping a fish only at its head does not necessarily free both hands throughout the entire filleting operation.

It is therefore an object of the present invention to provide a fish holding device which will support the fish in a vertical position, i. e. along its underside, during filleting.

It is still another object of this invention to provide a fish holding device which securely holds the fish in position, thereby freeing the hands for the filleting operation.

It is yet another object of this invention to provide a fish holding device which clamps the fish at three points along its body.

Other objects and advantages will become apparent from the following description and appended claims.

Briefly stated, in accordance with the aforesaid objects, the present invention comprises a base member having a side member mounted longitudinally thereon, the base member adapted to receive a fish thereon and, in combination with the side member, to support the fish along the underside and a side thereof; first clamping means on said base member adapted to engage the head of the fish and securely hold it to the base member; and second and third clamping means on the side member adapted to engage the body and tail of the fish, respectively, and securely hold the fish to the side member.

The invention will be better understood from the following description taken in conjunction with the accompanying drawings.

FIG. 1 is a plan view of the fish holding device of the present invention showing, in dotted lines, a fish disposed in a vertical position thereon.

FIG. 2 is a front elevational view of the device of FIG. 1 showing generally the vertical filleting cut which can be employed with the device of the present invention.

FIG. 3 is a sectional view taken substantially along the line 3—3 in FIG. 1.

FIG. 4 is a sectional view taken substantially along the line 4—4 in FIG. 1.

FIG. 5 is a sectional view taken substantially along the line 5—5 in FIG. 1.

FIG. 6 is a sectional view taken substantially along the line 6—6 in FIG. 2.

Turning now to the drawings, the fish holder of the present invention is designated generally at 10. Holder 10 consists of generally flat rectangular base member 12 and generally rectangular side member 14 adapted to be removably mounted on base 12. A fish disposed on holder 10 is supported along its underside by base 10 and along one side by side member 14. Head clamp assembly 16 is mounted near one end of base member 12 to securely hold the lower jaw of the fish. Body clamp 18 and tail clamp 20 are mounted on side member 14 to secure and immobilize the body and tail portions of the fish, respectively.

Side member 14 is mounted substantially parallel to the longitudinal axis of base member 12 with a longitudinal edge of side member 14 in contact with the upper surface of base member 12 and with an end of side member 14 flush with the end of base member 12 remote from head clamp assembly 16. Preferably, side member 14 is mounted by insertion of spaced apart pegs 22, extending from the longitudinal edge of side member 14 in contact with the upper surface of base member 12, into a pair of correspondingly spaced apart apertures 24 in the upper surface of base member 12. A number of aperture pairs 24 are provided to define a series of parallel positions for side member 14 along the surface of base member 12. It will be appreciated that side member 14 may be readily moved from one parallel position to the next merely by removing side member 14 from one pair of spaced apart apertures and then reinserting it into another pair of apertures.

Head clamp assembly 16, seen most clearly in FIG. 5, includes fingers 26 normally biased by resilient means 28 into engagement with the upper surface of base 12. Each finger 26 consists of a first element 30, adapted at one end thereof to engage the fish mouth, and a second element 32 extending from the other end of first element 30. Fingers 26 are oriented generally longitudinally with respect to base 12 with second element 32 supported substantially parallel thereto and first element 30 inclined downwardly from element 32 toward the remote end of base 12. Aperture 33 is formed in second element 32 to permit the fingers to be aligned and pivotally connected, such as by rivets 36, to each other. When so connected, fingers 26 may pivot in the horizontal plane only and may be spread apart or positioned overlying one another to accommodate the size of the fish mouth.

Tab 34 overlies and extends horizontally rearwardly from fingers 26 and is connected thereto by rivet 36. Fingers 26 and tab 34 are held in place by connection to resilient means 28 at A along the top surface of tab 34. Tab 34 may pivot in the horizontal plane, but is held rigidly by rivet 36 against pivotal movement in the vertical plane. Thus, when a force is applied to the free end of tab 34 causing downward movement thereof in the vertical plane, the movement is translated, via resilient means 28 acting as a fulcrum at A, into a corresponding upward movement of fingers 26 in the vertical plane, thereby removing first element 30 from engagement with base member 12 (as shown in phantom in FIG. 5). When the applied force is released resilient means 28 causes first elements 30 to snap back into engagement with base member 12 or with the lower jaw of a fish disposed thereon.

Cooperating with fingers 26 in securing the fish at its mouth is insert 38 positioned on the upper surface of base 12 at the free end of first elements 30 of fingers 26. Insert 38 extends preferably about one-fourth inch above the surface of base member 12 and has, projecting upwardly therefrom and forming an acute angle with base member 12, a plurality of sharp pins 40. When a fish head is to be held in head clamp assembly 16, pins 40 engage the outside of the lower jaw while first elements 30 of fingers 26 extend into the mouth to engage the inside of the lower jaw and, via resilient means 28, to depress the fish jaw against pins 40.

A locking device 42 may be employed in conjunction with head clamp assembly 16 after the fish head is secured by pins 40 and fingers 26. Locking device 42 comprises two externally threaded vertical posts 44 and 46 mounted on base member 12 on opposite sides of head clamp assembly 16. Coil springs 48 surround posts 44 and 46 and are seated at the lower ends thereof against the upper surface of base 12. Pivotally mounted on post 44 via an aperture 50 near one end thereof and secured against the urging of spring 48 via thumbscrew 52 is locking arm 54. Near the other end of locking arm 54 is a U-shaped opening 56 positioned to engage post 46 when arm 54 pivots about post 44. Thumbscrew 52 secures locking arm 54 against the urging of spring 48. A knob 57 may be provided on locking arm 54 for ease of grasping. As can be most clearly seen in FIG. 2, when locking arm 54 engages posts 44 and 46, it functions as an additional means of retaining fingers 26 in intimate engagement with the lower jaw of the fish.

Tail clamp 20, best seen in FIG. 4, is mounted on side member 14 near the end thereof remote from head clamp assembly 16. Tail clamp 20 consists essentially of a U-shaped member 58 mounted with the opening of the U disposed downwardly over side member 14. One leg 59 of member 58 has a plurality of spikes 60 extending essentially perpendicularly therefrom toward side member 14. When a fish tail is placed between leg 59 and side member 14, and tail clamp 20 is closed, spikes 60 engage the fish tail securely and hold it in place. Any suitable mechanism, well known in the art, may be used to move leg 59 toward side member 14 to close the clamp. Shown in FIG. 4 is an arcuate bearing surface, such as roller 62, mounted eccentric to its pivotal axis 64 which is connected to side member 14, and having an operating handle 66. Normally surface 62 has a relatively short radius in bearing contact with leg 68 of member 58, surface 62 occupying essentially the position shown in FIG. 4. As handle 66 is rotated, progressively longer radii of surface 62 are brought into contact with leg 68 forcing it away from side member 14, and, at the same time, moving spike mounted leg 59 toward side member 14 and into engagement with a fish tail interposed therebetween.

Intermediate tail clamp 20 and head clamp assembly 16, and adapted to engage the backbone or flesh of the fish after an initial cut has been made in the back of the fish, is body clamp 18 removably mounted on side member 14. Body clamp 18, best seen in FIG. 3, consists of a shaft member 70 and two arms 72 pivotally connected to shaft 70 near its top by spring 74, which normally urges the ends of arms 72 most remote from spring 74 (hereinafter designated "lower ends") into contact with shaft 70. Arms 72 have arcuate lower end portions 76 to securely clamp the fish body and are oriented with the hollow of the arcuate end generally facing shaft 70.

A number of recesses 78 are provided in the upper longitudinal edge of side member 14 for insertion of shaft 70 therein. Shaft 70 is sufficiently long and recesses 78 are sufficiently deep that by vertical movement of shaft 70 in recess 78, the vertical position of arcuate ends 76 of arms 72 may be adjusted to account for the size of the fish. With shaft 70 in recess 78, body clamp 18 may be opened by the application of force to the upper ends of shaft 70 and arms 72 tending to bring these ends together, thereby forcing arcuate ends 76 of arms 72 away from shaft 70. After a fish is inserted adjacent side member 14, the vertical position of arcuate ends 76 is adjusted and the applied force released, permitting spring 74 to urge arcuate ends 76 toward shaft 70 and into engagement with the fish body.

Base member 12 may be mounted for rotation on support member 80 via pivot bolt 82 to permit the rotation of base 12 to a convenient position for filleting. Conventional locking means, such as screw-type locking means 84, secures base 12 to support member 80 in the desired position.

Filleting of a fish using the holder 10 of the present invention is a simple and convenient operation since the fish is held securely in the optimum filleting position and the hands are free to use the knife and simultaneously peel the fillet away from the bone structure of the fish. First, side cuts are made behind the gills and front fins into, but not through, the backbone. Tab 34 is depressed raising the tips of fingers 26 out of contact with the upper surface of base 12. Holding the fish upright with the dorsal facing upwardly, first elements 30 of fingers 26 are inserted into the fish mouth and then tab 34 is released. The force of resilient means 28 impales the underside of the lower jaw of the fish on pins 40. If desired, locking arm 54 may be rotated into engagement with post 46 and thumbscrews 52 tightened against the force of springs 48, thereby locking fingers 26 into engagement with the fish jaw. The fish is now securely held and cannot move longitudinally.

Side member 14 is next positioned with pegs 22 in a pair of spaced apart apertures 24 such that one side of the fish remains accessible for filleting. The position of side member 14 depends upon the width of the fish and the hand, right or left, used to cut the fish. For example, side member 14 would be initially positioned generally as shown in FIG. 1 for a right-handed person. With side member 14 in position, the tail of the fish is interposed between side member 14 and leg 59 of tail clamp 20, and handle 66 is rotated to securely engage the fish tail with spikes 60. The fish is now anchored against lateral movement.

A 1 inch deep cut is next made down one side of the back of the fish from head to tail following generally the backbone or dorsal of the fish. A similar cut is made along the other side of the backbone or dorsal. Shaft 70 of body clamp 18 is positioned in a convenient recess 78 to engage the backbone or flesh of the fish. The upper ends of body clamp 18 are forced together thus opening the clamp against the force of spring 74. The clamp is adjusted vertically in recess 78 to account for the size of the fish and arcuate portions 76 of arms 72 are inserted into the cut so that the backbone or flesh is held between arms 72 and side member 14. The clamp is then allowed to return to its normally closed position. Both hands are now free to cut and remove the fillet by cutting down and around the ribs with a knife in one hand and holding and pulling the fillet with the other. As soon as the fillet is free from one side of the fish, tail clamp 20 and body clamp 18 are released and side member 14 is re-positioned along the other side of the fish. Tail clamp 20 and body clamp 18 are then operated, as hereinbefore described, to once again secure the fish to base member 12 and side member 14. If desired, locking device 84 may be released and the base pivoted about bolt 82 to a convenient position for filleting the second side of the fish.

While the present invention has been described with reference to particular embodiments thereof it should be understood that numerous modifications may be made by those skilled in the art without actually departing from the scope of the invention. Accordingly, all suitable modifications and equivalents may be resorted to which fall within the scope of the invention as claimed.

What is claimed as new is as follows:

1. A device for securely holding a fish in a vertical position during the filleting thereof, comprising:

a base member having a side member mounted longitudinally thereon, said base member adapted to receive a fish thereon and, in combination with said side member, to support the fish along its underside and a side thereof;

first clamping means on said base member adapted to engage the head of the fish and securely hold it to said base member; and second and third clamping means on said side member adapted to engage the body and tail of the fish, respectively, and securely hold the fish to said side member.

2. A device, as claimed in claim 1, wherein said first clamping means includes first and second pointed clamping means to cooperatively engage the lower jaw of the fish.

3. A device, as claimed in claim 2, wherein said first clamping means further includes locking means to lock said first clamping means into engagement with the fish jaw.

4. A device, as claimed in claim 2, wherein said first pointed means comprises a plurality of pins projecting upwardly from said base member and said second pointed means comprises elongated fingers resiliently biased into contact with said base.

5. A device, as claimed in claim 3, wherein said locking means comprises a pair of posts mounted on said base member, said posts sufficiently spaced apart to permit the interposition of a fish jaw therebetween, resilient means on said posts and seated on said base member, an arm releasably connected between said posts and supported by said resilient means, and means to secure said arm to said posts against the bias of said resilient means.

6. A device, as claimed in claim 5, wherein said first pointed means comprises a plurality of pins projecting upwardly from said base member and forming an acute angle therewith in the direction of said second pointed means, and said second pointed means comprises a pair of fingers pivotally connected for movement in a horizontal plane, each of said fingers having an end thereof adapted for engagement with the fish mouth, said ends forming an acute angle with said base member, resilient means associated with said fingers biasing said ends into engagement with said fish mouth, and means connected to said fingers adapted to receive a force opposing the bias of said resilient means to move said ends to a non-engaging position.

7. A device, as claimed in claim 1, wherein said second clamping means includes a shaft member having one end thereof adapted for removable insertion into a recess in said side member, a pair of arm members, each of said arm members having an arcuate end for engagement with the fish body, and resilient means pivotally connecting said shaft to said arm members and normally urging said arcuate ends toward said shaft.

8. A device, as claimed in claim 1, wherein said third clamping means includes a flanged member having at least a portion thereof substantially parallel to and facing said side member, a plurality of pointed elements disposed on said portion on the side thereof adjacent said side member, and engaging means for moving said portion laterally toward said side member whereby a fish tail interposed therebetween will be securely clamped between said elements and said side member.

9. A device, as claimed in claim 8, wherein said flanged member is an inverted U-shaped member having a leg disposed on each side of said side member, said elements disposed on a surface of one of said legs, and wherein said engaging means includes a shaft connected to said side member, an eccentric pivoted on said shaft, said eccentric bearing upon the other of said legs, and means to cause rotation of said eccentric about said shaft whereby said elements are moved toward said side member into engagement with a fish tail disposed between said elements and said side member.

10. A device, as claimed in claim 1, wherein said base member includes spaced apart apertures in the upper surface thereof and said side member includes cooperatively spaced apart pegs extending along a longitudinal edge thereof, said pegs adapted to fit within said apertures in said base member whereby said side member may be removably mounted on said base member.

11. A device, as claimed in claim 1, including means for rotatably mounting said base member on a support member.

12. A device for securely holding a fish in a vertical position during the filleting thereof, comprising:

a base member having a side member removably mounted longitudinally thereon, said side member having a plurality of recesses along the upper longitudinal edge thereof, said base member adapted to receive a fish thereon and, in combination with said side member, to support the fish along the underside and a side thereof;

first clamping means on said base member adapted to engage the head of the fish and securely hold it to said base member, said means comprising first and second pointed means to cooperatively engage the lower jaw of the fish and locking means to secure said second pointed means into engagement with the fish jaw, said first pointed means comprising a plurality of pins projecting upwardly from said base member and forming an acute angle therewith in the direction of said second pointed means and said second pointed means comprising a pair of fingers pivotally connected for movement in a horizontal plane, each of said fingers having an end thereof adapted for engagement with the fish mouth, said end forming an acute angle with said base member, resilient means associated with said fingers biasing said ends into engagement with said fish mouth, and means connected to said fingers adapted to receive a force opposing the bias of said resilient means to move said ends to a non-engaging position, and said locking means comprising a pair of posts mounted on said base member, said posts sufficiently spaced apart to permit the interposition of a fish jaw therebetween, resilient means on said posts and seated on said base member, an arm releasably connected between said posts and supported by said resilient means, and means to secure said arm to said posts against the bias of said resilient means;

second clamping means on said side member adapted to engage the body of the fish, including a shaft member having one end thereof adapted for removable insertion into said recess in said side member, a pair of arm members, each of said arm members having an arcuate end for engagement with the fish body, and resilient means pivotally connecting said shaft to said arm members and normally urging said arcuate ends toward said shaft; and third clamping means on said side member adapted to engage the tail of the fish, including an inverted U-shaped member having a leg disposed on each side of said side member, a plurality of pointed elements disposed on a face of one leg adjacent said side member and projecting toward said side member, and means for moving said leg laterally toward said side member.

* * * * *